United States Patent

Maydan et al.

[11] Patent Number: 5,848,275
[45] Date of Patent: Dec. 8, 1998

[54] COMPILER HAVING AUTOMATIC COMMON BLOCKS OF MEMORY SPLITTING

[75] Inventors: Dror E. Maydan, Mountain View; Sun C. Chan, Fremont; James C. Dehnert, Palo Alto; Jack C. Carter, Cupertino, all of Calif.

[73] Assignee: Silicon Graphics, Inc., Mountain View, Calif.

[21] Appl. No.: 688,020

[22] Filed: Jul. 29, 1996

[51] Int. Cl.⁶ .............................. G06F 12/06; G06F 12/08
[52] U.S. Cl. .................... 395/705; 395/709; 395/701; 711/3; 711/118; 711/122
[58] Field of Search ..................... 395/705, 709, 395/183.06, 185.06, 183.11, 561, 855, 183.01, 872, 853; 711/167.3, 133, 140, 122, 146, 118, 143, 117, 119, 141

[56] References Cited

U.S. PATENT DOCUMENTS

| | | | |
|---|---|---|---|
| 4,613,935 | 9/1986 | Couleur | 395/561 |
| 4,991,088 | 2/1991 | Kam | 395/709 |
| 5,193,180 | 3/1993 | Hastings | 395/183.11 |
| 5,497,458 | 3/1996 | Finch et al. | 395/183.06 |
| 5,644,709 | 7/1997 | Austin | 395/185.06 |
| 5,649,161 | 7/1997 | Andrade et al. | 711/167 |

FOREIGN PATENT DOCUMENTS

| | | | |
|---|---|---|---|
| 0674268A2 | 9/1995 | European Pat. Off. | G06F 12/08 |
| WO 92/16894 | 10/1992 | WIPO | G06F 11/34 |

OTHER PUBLICATIONS

Per Ling. "A Set of High–Performance Level 3 BLAS Structured and Tuned for the IBM 3090 VF and Implemented in Fortran 77." Sep. 1993. *The Journal of Supercomputing* No. 3. Boston, US.

J.E. Aull. "Validation Using CASE Tools." Apr. 5, 1992. *IEEE*.

*Primary Examiner*—James P. Trammell
*Assistant Examiner*—Cuong H. Nguyen
*Attorney, Agent, or Firm*—Wagner, Murabito & Hao

[57] ABSTRACT

In a computer system having a cache memory and a main memory for storing data, a method for laying out blocks of data to minimize a number of memory transfers between the cache memory and the main memory. Memory layout normally occurs at link time, after all the source files have been compiled. The code is compiled with the assumption that the memory blocks can be optimally placed. The linker then determines whether there has been any memory violations. Memory violations are marked. All marked memory locations are then placed in a layout that satisfies adjacency requirements.

18 Claims, 4 Drawing Sheets

COMPILER HAVING AUTOMATIC COMMON BLOCKS OF MEMORY SPLITTING

FIELD OF THE INVENTION

The present invention pertains to the field of compilers. More particularly, the present invention relates to a method for automatically splitting common blocks of memory during compilation to optimize the performance of a computer program.

BACKGROUND OF THE INVENTION

Computers are being used today to perform a wide variety of tasks. Many different areas of business, industry, government, education, entertainment, and most recently, the home, are tapping into the enormous and rapidly growing list of applications developed for today's increasingly powerful computer devices. Computers have also become a key technology for communicating ideas, data, and trends between and among business professionals. These devices have become so useful and ubiquitous, it would be hard to imagine today's society functioning without them.

Computers operate by executing programs, or a series of instructions stored in its memory. These programs, and their series of instructions, are collectively referred to as software. Software is key to utility of computers. Software is what makes the computer devices function and perform useful tasks. Good software makes for effective machines, while poor software makes for difficult to use, less effective machines. Thus, the utility of the computer device often hinges upon the utility of the software written for the device.

Software is written by professionals referred to as programmers or software engineers. As programs have become larger and more complex, the task of writing software has become correspondingly more difficult. As a result, programmers typically code in "high level languages" to improve productivity. The use of high level language makes the task of writing extremely long and complex programs more manageable. The completed program, however, must be translated into machine executable language in order to run on a computer. Programmers rely upon compilers to translate their program written in high level language into a program comprised of machine executable code, known as "machine language."

Compiler effectiveness and sophistication is directly related to the speed and reliability of the machine executable code. The process of translating the program written in high level language into a program written in machine language is referred to as compiling. The actual translation is performed by a software program referred to as a compiler. The compiler operates on the program written in high level language. The high level language program is referred to as source code. The compiler translates the source code into machine executable code. Ultimately, it is the machine executable code which will run on the computer. Thus, the speed and reliability of the executable code depends upon the performance of the compiler. If the compiler is inefficient, the speed of the executable code will be slower than necessary. Other attributes, such as reliability and code size, may also be affected. Hence, it is critical to the speed and efficiency of the program that the compiler thoroughly optimizes the executable code during the translation process.

One area in which compilers can optimize computer programs relates to memory accesses. The goal of compiler is to keep memory accesses to a minimum because they require an inordinate amount of processing time to execute. Generally, computer programs and related data are usually in a non-volatile hard disk drive. When the computer is powered up, relevant information is read from the hard disk drive and stored into a main memory residing within the computer system. This main memory usually consists of dynamic random access memory (DRAM). The microprocessor must then read the instructions and data stored in main memory, process the data, and then write the new data back into main memory. Eventually, the new data will be stored back onto the hard disk drive. These read/write operations require a great deal of time to execute because the microprocessor must first request access to the bus. Next, conflicts from other devices also requesting the bus must then be arbitrated and resolved. Only after the bus becomes available can data be stored onto or retrieved from the main memory. Meanwhile, other devices coupled to the bus must wait until the read/write operation completes and the microprocessor relinquishes the bus. Hence, excessive memory accesses can drastically slow down the overall speed of the computer system.

In an effort to minimize the amount of time involved with memory accesses, designers have incorporated small amounts of "cache" memory (e.g., static random access memory—SRAM) within the microprocessor itself or close to the microprocesser. The first time a memory access is performed, small blocks of data are stored into the cache memory from the main memory. Thereby, the microprocessor can readily access the requisite data from its own cache memory rather than from the main memory. If the requested data does not currently reside within the cache, a cache "miss" occurs, and the cache must then be updated with a block of data containing the desired data.

As caches are smaller than main memory, multiple memory locations may map into the same cache locations. When bringing data into the cache, the system must invalidate or write back to main memory other data residing in the same cache location. Cache misses caused by multiple memory locations being mapped to the same cache location are called "conflict misses".

A serious problem might arise if the computer program regularly requests data which does not currently reside within the cache. Oftentimes, the human computer programmer is oblivious to how cache memory actually works. Hence, the programmer may inadvertently write code that results in excessive cache misses. In a worst case scenario, the programmer might inadvertently write code having a loop whereby every read operation results in a conflict miss. Clearly, cache misses slow down the speed of the computer system and should be avoided.

Thus, there is a need in the prior art for a compiler which can effectively reduce the number of cache misses without changing the outcome of the computer program. The present invention provides one solution, whereby blocks of data are rearranged so that conflict cache misses are minimized. The compiler detects those instances in the computer program which might result in successive cache misses and rearranges blocks of data so as to eliminate a majority of those cache misses. Thereby, the speed at which the computer program can be run is tremendously increased.

SUMMARY OF THE INVENTION

The present invention pertains to a method for efficiently laying out Fortran common block arrays in a computer system having a cache memory and a main memory, whereby the number of memory transfers between the cache memory and the main memory is minimized. The Fortran language allows programs to make assumptions about the layout of arrays inside common blocks. Yet, it is rare that the programmer relies on such assumptions. The compiler can improve the layout if the program makes no such assumption. The invention allows the compiler to improve the layout when possible, retain the original semantics when relayout is not possible and still allows the compiler to compile different subroutines separately. Initially, a compiler is used to compile all of the source files of a computer program into corresponding object files. The code is compiled with the assumption that the memory blocks can be optimally placed. Memory layout occurs at link time, after all the source files have been compiled. The linker determines whether the user has made any assumptions about memory layout. In the currently preferred embodiment, memory assumptions are determined according to whether the programmer uses an equivalence to group together multiple elements in a common variable; declares a common variable incompatibly in two different subroutines; takes the address of an element of the common block; uses a BLOCK DATA command to initialize multiple elements of the common variable; or compiles any of the files without using the splitting feature. All memory assumptions are marked at compile time. The linker then goes back and lays out the marked memory blocks so that adjacency requirements are satisfied. For unmarked blocks, the linker chooses a layout to minimize conflict misses.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A compiler having automatic common block splitting for minimizing cache misses is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
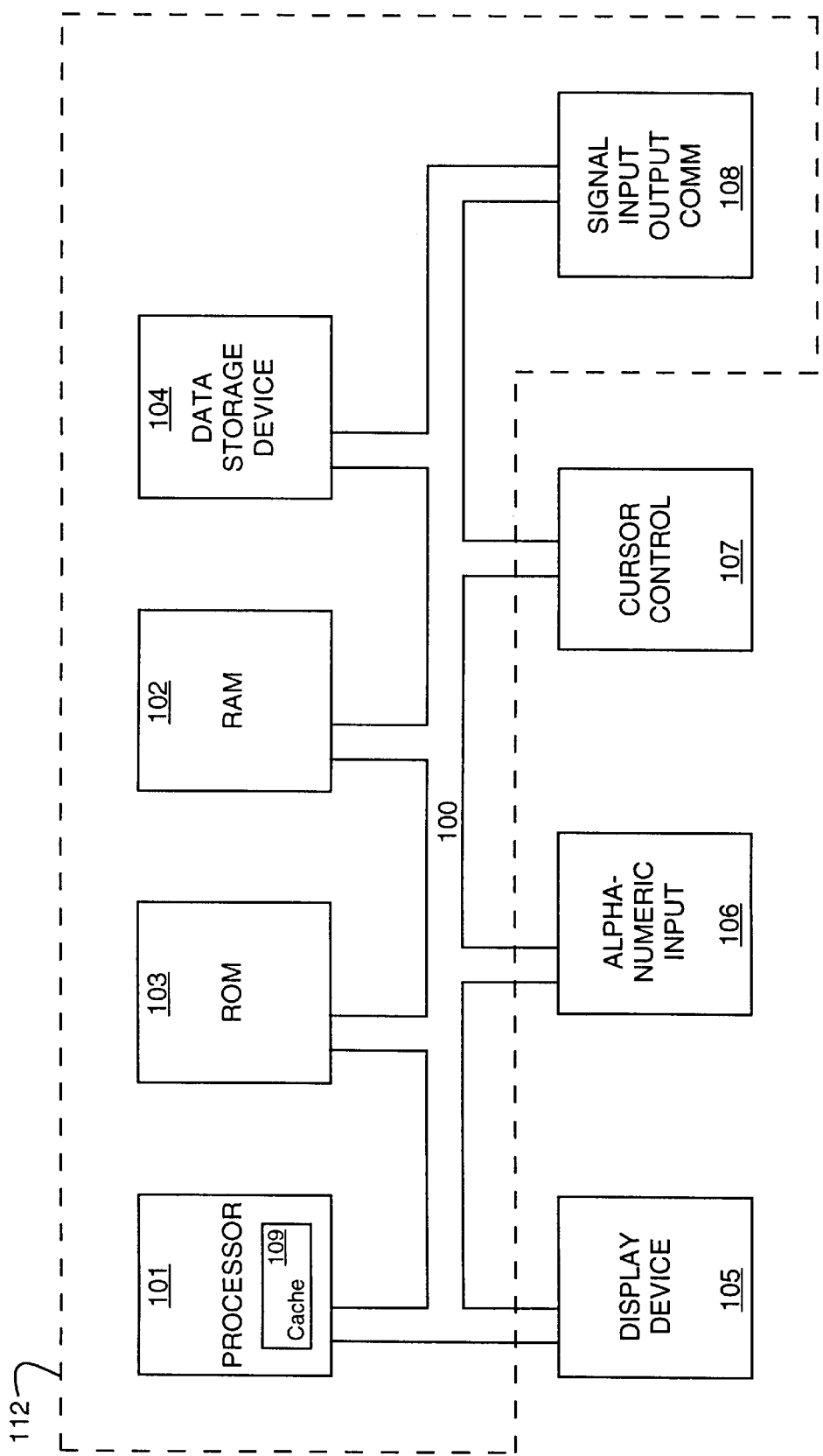
FIG. 1 illustrates an exemplary computer system upon which the present invention may be practiced.

FIG. 1 illustrates an exemplary computer system 112 upon which the present invention may be practiced. It is appreciated that the computer system 112 of FIG. 1 is exemplary only and that the present invention can operate within a number of different computer systems including general purpose computers, embedded computers, portable computers, and computer systems specially adapted for graphics display. Computer system 112 of FIG. 1 includes an address/data bus 100 for communicating information between the various components. A central processor unit 101 is coupled to the bus 100. It is used for processing information and instructions. Also coupled to bus 100 is a random access memory 102 (e.g., DRAM) for storing information and instructions for the central processor 101. A small cache memory 109 resides within microprocessor 101. Processor 101 reads data from and writes data to cache 109. Occasionally, data from main memory 102 is loaded into cache 109 and the main memory 102 is updated with the most recent data from cache 109. A read only memory (ROM) 103 is used for storing semi-permanent information and instructions for the processor 101. For storing vast amounts of data, a data storage device 104 (e.g., a magnetic or optical disk and disk drive) is coupled to bus 100. The compiler may be stored on disk or within ROM 103. Finally, an I/O unit 108 is used to interface the computer system 112 with external devices (e.g., keyboard, modem, network interface, display, mouse, etc.). Externally, a display device 105 is coupled to bus 100 for displaying information (e.g., graphics, text, spreadsheets, etc.) to a computer user. An alphanumeric input device 106 (e.g., a keyboard) is used for communicating information and command selections to the central processor 101. Optionally, a cursor control device 107 (e.g., a mouse, trackball, etc.) is used for communicating user input information and command selections to the central processor 101.

Figure 2:
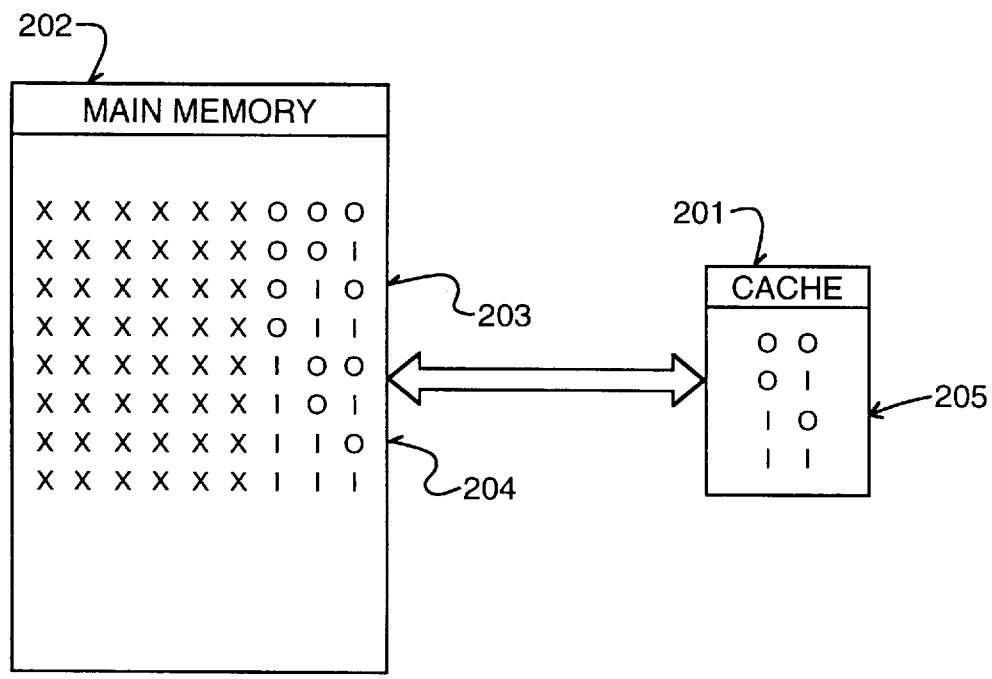
FIG. 2 shows a block diagram of a cache memory.

FIG. 2 shows a block diagram of a cache memory 201. Since the cache 201 is much smaller than main memory 202, there are different locations within main memory 202 which might end up in the same location within cache 201. This is due to the fact that the cache location is determined based on the last N-bits of the main memory address. As a simple example, it can be seen that line 203 has an address of xxxxxx010. Based on its last two bits "10," line 203 corresponds to line 205 of cache 201. In comparison, line 204 of main memory 202 has an address of xxxxxx110. The last two bits of line 204 also ends with "10." Hence, line 204 is also associated with line 205 of cache 201. As a result, each time one of these two lines 203–204 is referenced, the other line is flushed from cache 201. In reality, the last several (20, for example,) rather than the last two bits, are used to determine the cache location. Addresses that are large powers of two apart will always end up at the same cache location. And each time one of those addresses is referenced, the other is flushed from the cache.

The following loop demonstrates how a cache operates:

$$\text{do } i = 1, n$$
$$a(i) = 0$$

On the first iteration, a store operation a(1) causes that data to be loaded into the cache. A cache element, or cache line, maybe larger than a single data item. Typical cache lines contain 4–32 data elements. On each cache miss, the entire cache line is brought into the cache. As an example, we assume a cache line contains 16 elements. Therefore, in the next iteration, a(2), already has its data loaded in the cache. Similarly, a(3) through a(16) are already in the cache. However, the store a(17) operation requires putting a(17)–a (32) into the cache. This causes the microprocessor to stall perhaps 200 cycles for the cache update. This process is repeated for the next sixteen elements, etc.

Now, assume that the following code was written:

$$\text{Common } a(1024 \times 1024), b(1024 \times 1024)$$
$$\text{Do } i = 1, n$$

-continued
```
        a(i) = 0
        b(i) = 0
       END DO
```

On the first iteration, a store a(1) operation causes a(1)–a(16) to be loaded into the cache. The store b(1), causes the microprocessor to stall while b(1)–b(16) are loaded into the cache in place of a(1)–a(16). This occurs because these two common variables are powers of two apart ($2^{10}$=1024 and 1024×1024=$2^{20}$),and hence, fall in the same place in the cache memory. Likewise, the second iteration, store a(2), causes the microprocessor to stall and load a(1)–a(16) in place of b(1)–b(16), etc. Having to update the cache in this manner for each successive operation is very inefficient. But because the programmer is not familiar with how a cached memory system operates, he might be completely unaware of the problem.

A much more efficient piece of code would have one of the common variables be assigned with an address that was not a factor of two apart from the other one. For example, the following code is a much more efficient way of accomplishing the same task:

```
    Common a(1024 × 1024),b(1024 × 1024)
       Dimension
         do I = 1,n
          a(i) = 0
          b(i) = 0
         END DO
```

In this case, the two variables fall into different cache locations. For the first iteration of the loop, store a(1) causes a(1)–a(16) to be loaded into the cache. Than, store b(1), causes b(1)–b(16) to be loaded into the cache in a different location than that of a(1)–a(16). As a result, both a(1)–a(16) and b(1)–b(16) reside within the cache. This is due to the fact that these two common variables were intentionally spaced apart so that they are not powers of two. And since the variable do not fall in the same place in the cache, they can both simultaneously reside within the cache. Now, in the second iteration, store a(2), already resides in the cache and does not require a main memory access. Likewise, b(2) in the second iteration does not require a main memory access because b(2) had already previously been loaded into the cache. This code is approximately sixteen times faster to execute than the less efficient code described above.

Figure 3A:
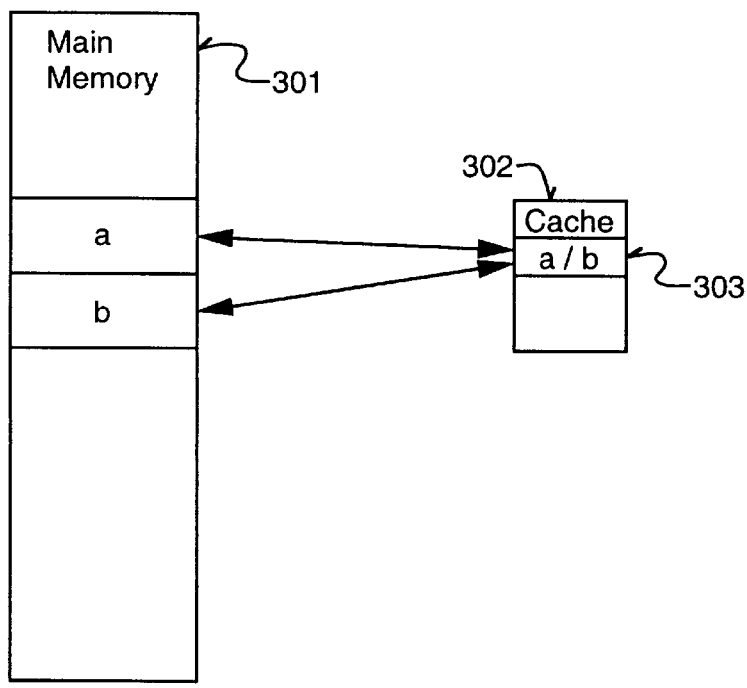
FIG. 3(a) shows an example of code having adjacent variables "a" and "b" which are powers of two apart in main memory.
Figure 3B:
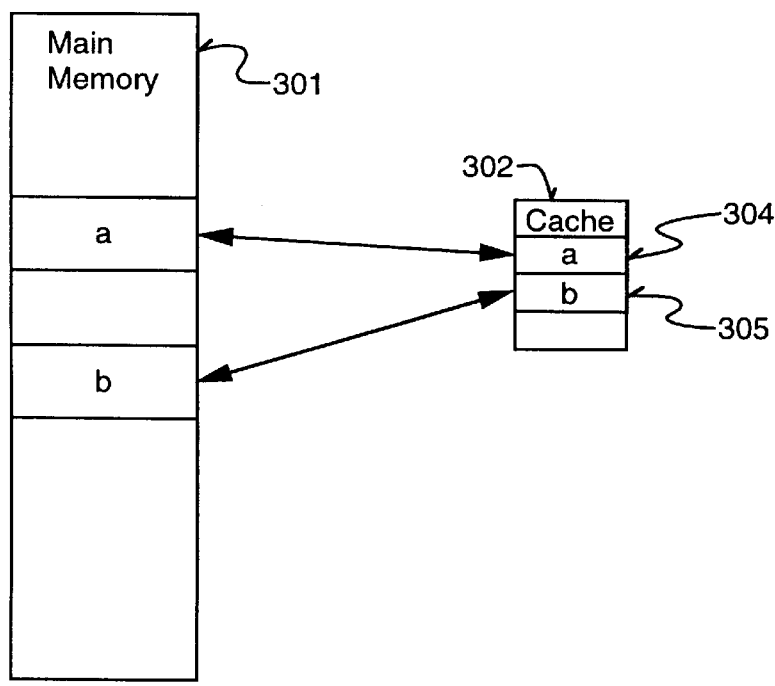
FIG. 3(b) shows an example of the same code after it has been compiled according to the present invention, whereby the block of data has been split into two different portions.

The present invention detects those instances where addresses are spaced powers of two apart (or close to powers of two apart) and takes corrective action to automatically remedy the situation. Normally, the "b" variable is adjacent to the "a" variable. However, the compiler shifts the block of data associated with the "b" variable several lines down from the "a" variable. In other words, common blocks of data are automatically split by the compiler in order to eliminate cache "thrashing." FIG. 3(*a*) shows an example of code having adjacent variables "a" and "b" which are factors of two apart in main memory 301. It can be seen that both "a" and "b" reference the same location 303. FIG. 3(*b*) shows an example of the same code after it has been compiled according to the present invention, whereby the block of data has been split into two different portions. It can be seen that both "a" and "b" can now be written to cache 302. Variable "a" is written to location 304, whereas variable "b" is written to location 305.

However, there may be instances where it is illegal to separate the blocks of data. For example, in the Fortran computer language, users are allowed, under certain circumstances, to assume that two adjacent elements of a common block are allocated adjacently in memory. To optimize program performance, the compiler would like to be free to allocate common elements anywhere. The problem, then, is to detect at compile time that the user did not write the code assuming adjacent layouts. The difficulty arises because the user can use a common block in multiple program units (e.g., files). If the user writes code with no assumptions in one file, but assuming a particular layout in the second file, the compiler must conservatively use an adjacent layout in both files.

In one embodiment, this problem is handled by an interprocedural analysis. The interprocedural analysis is performed as part of the compiler. With this procedure, the entire computer program is compiled at one time. Even though the computer program might be divided into multiple procedures and files, interprocedural analysis groups everything together and collectively compiles them. This collective compilation technique allows the compiler to determine whether the blocks of data can safely be separated without resulting in any errors.

In some instances, an interprocedural analysis is not performed because it is too time-consuming and the computer program is overly complex. In these cases, the issue is how to determine whether the blocks can safely be separated. The present invention provides an elegant, efficient solution as follows. The key observation is that layout normally occurs at link time, after all the files have been compiled. Thus, in the currently preferred embodiment of the present invention, the compiler compiles the computer program and assumes that it is free to layout the common block elements any way that it desires or determines to be most efficient. A simple linear search is used to detect all cases that require adjacent layouts. If such a requirement is detected, the linker then selects a layout that matches the adjacency requirements. The possible failure cases, whereby the linker conservatively lays out the elements adjacently include:

1. The programmer uses an equivalence to group together multiple elements in a common variable.

2. The programmer declares a common variable incompatibly in two different subroutines.

3. The programmer takes the address of an element of the common block.

4. The programmer uses a BLOCK DATA command to initialize multiple elements of the common variable.

5. The programmer compiles any of the files without using the splitting feature.

Figure 4:
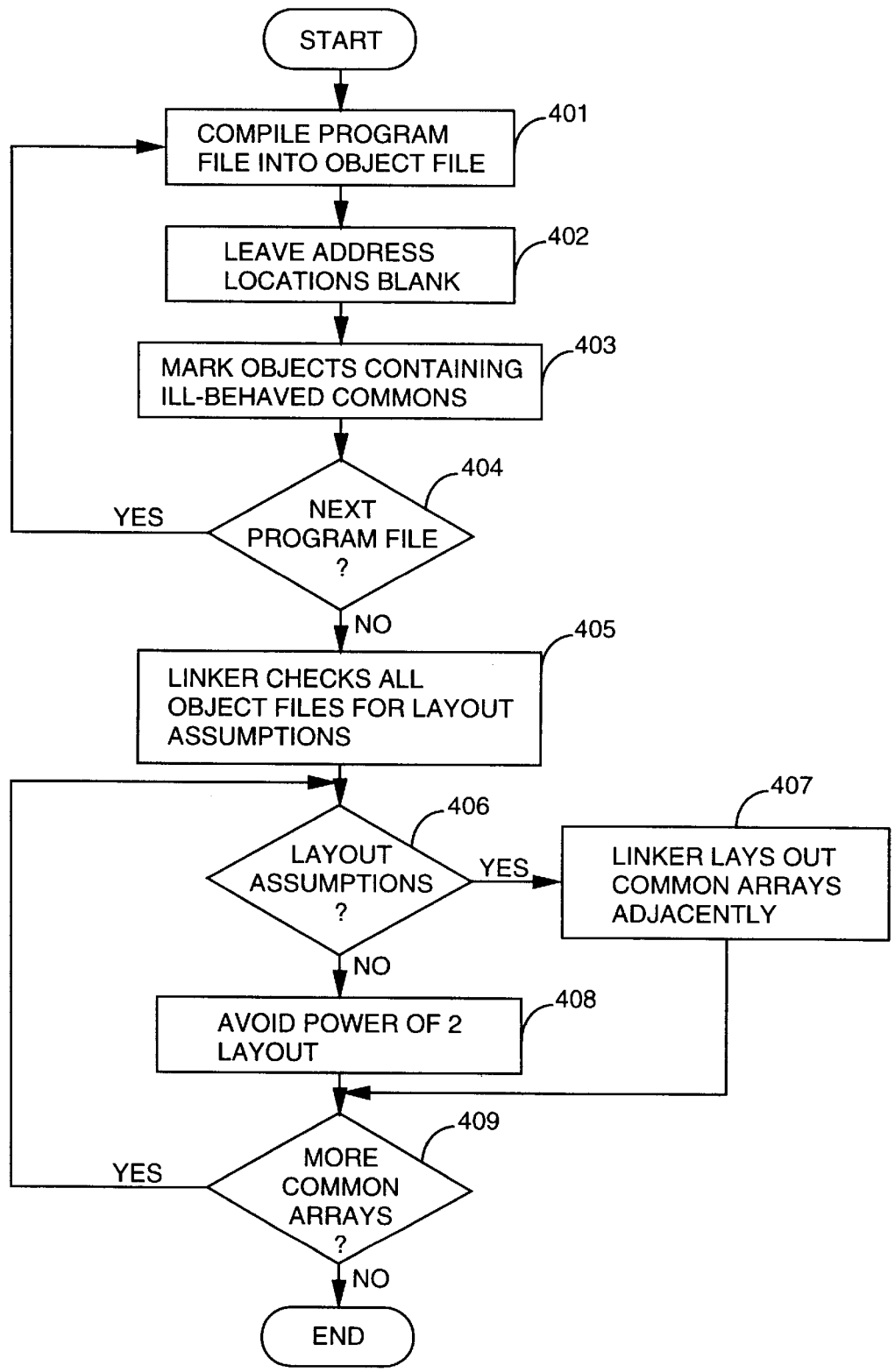
FIG. 4 is a flowchart describing the steps for optimal common block splitting.

FIG. 4 is a flowchart describing the steps for optimal common block splitting. Initially, the compiler converts a program file into a corresponding object file, step 401. The address locations are intentionally left blank, step 402. Alternatively, names or place holders may be assigned to the address locations. The compiler marks objects containing ill-behaved commons, step 403. The compiler repeats this process for each of the source code files, as indicated by decision block 404. In step 405, the linker processes all the objects, checking for layout assumptions. Some assumptions, such as equivalencies, were marked by the compiler in the object files. Others, such as mismatched commons, are easily checked during the linking process. Step 406 determines whether any layout assumption is needed for a common array. If so, the linker uses a sequential layout in 407. Otherwise, the linker optimizes the layout to improve performance in step 408. A determination is made in step 409 as to whether there are any more common arrays. If there are other arrays, the process repeats step 406. Otherwise the process is done.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a compiler, a method for optimizing memory accesses, comprising the steps of:

compiling a source file into an object file, wherein memory locations are left unassigned;

assigning memory locations at link time;

determining whether an address layout assumption has occurred;

if the address layout assumption has occurred, placing blocks of data with memory layout assumptions so that the blocks are adjacent;

placing other blocks of data in a way that optimizes performance.

2. The method of claim 1, wherein the determining step is comprised of detecting whether an equivalence function is used to group together multiple elements in a common variable.

3. The method of claim 1, wherein the determining step is comprised of detecting whether a common variable is declared incompatibly in two different subroutines.

4. The method of claim 1, wherein the determining step is comprised of detecting whether an address of the common block is taken.

5. The method of claim 1, wherein the determining step is comprised of detecting whether a block data command is used to initialize multiple elements of a common variable.

6. The method of claim 1, wherein the determining step is comprised of detecting whether any files are compiled without having a capability of splitting common blocks of data.

7. A computer system having a compiler for compiling source code into object code, wherein the compiler is comprised of:

a converter for converting source files into object files, wherein common variables are assumed to be global and memory locations are assigned so that common blocks of data are spaced apart in memory in order to minimize memory accesses;

a linker for linking the objects files together, wherein the linker determines whether an address assumption is violated due to splitting apart common blocks of data and if an address assumption does occur, the corresponding blocks of data are placed so that the blocks are adjacent to each other.

8. The computer system of claim 7, wherein the linker determines whether an equivalence function is used to group together multiple elements in a common variable to detect the address assumption.

9. The computer system of claim 7, wherein the linker determines whether a common variable is declared incompatibly in two different subroutines to detect the address assumption.

10. The computer system of claim 7, wherein the linker determines whether an address of the common block is taken to detect the address assumption.

11. The computer system of claim 7, wherein the linker determines whether a block data command is used to initialize multiple elements of a common variable to detect the address assumption.

12. The computer system of claim 7, wherein the linker determines whether any files are compiled without having a capability of splitting common blocks of data to detect the address assumption.

13. In a computer system having a cache memory and a main memory for storing data, a method for laying out blocks of data to minimize a number of memory transfers between the cache memory and the main memory, comprising the steps of:

compiling source files into object files;

laying out the blocks of memory so that memory addresses differing by powers of two are avoided;

linking the compiled object files;

determining whether two blocks of data have illegally been split apart;

if the two blocks of data have been illegally split apart, placing the two blocks of data so that the blocks are adjacent to one another.

14. The method of claim 13, wherein the determining step is comprised of detecting whether an equivalence function is used to group together multiple elements in a common variable.

15. The method of claim 13, wherein the determining step is comprised of detecting whether a common variable is declared incompatibly in two different subroutines.

16. The method of claim 13, wherein the determining step is comprised of detecting whether an address of the common block is taken.

17. The method of claim 13, wherein the determining step is comprised of detecting whether a block data command is used to initialize multiple elements of a common variable.

18. The method of claim 13, wherein the determining step is comprised of detecting whether any files are compiled without having a capability of splitting common blocks of data.

* * * * *